US010728555B1

(12) United States Patent
Sarwer et al.

(10) Patent No.: US 10,728,555 B1
(45) Date of Patent: Jul. 28, 2020

(54) EMBEDDED CODEC (EBC) CIRCUITRY FOR POSITION DEPENDENT ENTROPY CODING OF RESIDUAL LEVEL DATA

(71) Applicant: SONY CORPORATION, Tokyo (JP)

(72) Inventors: Mohammed Golam Sarwer, San Jose, CA (US); Ali Tabatabai, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/268,554

(22) Filed: Feb. 6, 2019

(51) Int. Cl.
| | |
|---|---|
| *H04N 19/13* | (2014.01) |
| *H04N 19/124* | (2014.01) |
| *H04N 19/176* | (2014.01) |
| *H04N 19/129* | (2014.01) |
| *H04N 19/40* | (2014.01) |

(52) U.S. Cl.
CPC .......... *H04N 19/13* (2014.11); *H04N 19/124* (2014.11); *H04N 19/129* (2014.11); *H04N 19/176* (2014.11); *H04N 19/40* (2014.11)

(58) Field of Classification Search
CPC .... H04N 19/13; H04N 19/129; H04N 19/124; H04N 19/176; H04N 19/40
See application file for complete search history.

(56) References Cited

U.S. PATENT DOCUMENTS

| | | | |
|---|---|---|---|
| 9,172,965 B2 | 10/2015 | Tu et al. | |
| 9,374,602 B2 | 6/2016 | Lee et al. | |
| 9,538,044 B2 | 1/2017 | Su et al. | |
| 2012/0099646 A1* | 4/2012 | Coban | H04N 19/176 375/240.12 |
| 2013/0003859 A1* | 1/2013 | Karczewicz | H04N 19/70 375/240.24 |
| 2013/0170761 A1 | 7/2013 | Wey et al. | |
| 2015/0264362 A1 | 9/2015 | Joshi et al. | |
| 2017/0257645 A1* | 9/2017 | Thiagarajan | H04N 19/126 |
| 2018/0034472 A1* | 2/2018 | Marpe | H03M 7/46 |

* cited by examiner

*Primary Examiner* — Jared Walker
(74) *Attorney, Agent, or Firm* — Chip Law Group

(57) ABSTRACT

Embedded codec (EBC) circuitry includes a memory to store a plurality of blocks of quantized-transformed residual levels for a plurality of image blocks of an input image and encoder circuitry to classify a plurality of quantized-transformed residual levels in a first block of the plurality of blocks, into a first set of quantized-transformed residual levels and a second set of quantized-transformed residual levels. The encoder circuitry applies a first entropy coding scheme on the first set of quantized-transformed residual levels, and a combination of the first entropy coding scheme and a second entropy coding scheme on the second set of quantized-transformed residual levels in a Direct Current-to-Alternating Current (DC-to-AC) scan order in the first block. A bit-stream of encoded image block is generated, by the encoder circuitry, by application of the first entropy coding scheme and the combination of the first entropy coding scheme and the second entropy coding scheme.

22 Claims, 7 Drawing Sheets

US 10,728,555 B1

EMBEDDED CODEC (EBC) CIRCUITRY FOR POSITION DEPENDENT ENTROPY CODING OF RESIDUAL LEVEL DATA

CROSS-REFERENCE TO RELATED APPLICATIONS/INCORPORATION BY REFERENCE

None.

FIELD

Various embodiments of the disclosure relate to image and video compression and decompression technology in embedded codec (EBC) circuitry. More specifically, various embodiments of the disclosure relate to EBC circuitry for position dependent entropy coding of residual level data.

BACKGROUND

Recent advancements in imaging technologies for image compression has led to an increase in demand for on-chip codecs in image capturing and display devices that can store images with different resolutions (e.g., Full High Definition (HD) 4K resolution, and 8K resolution), without having a significant degradation in visual quality and/or an impact on memory usage. Conventionally, at the entropy coding stage, the number of bits used to encode some of the residual levels for an image block may include redundant bits, which may be caused by a conventional use of a uniform entropy coding schemes on all types of residual levels for an image block. The redundancy in the number of bits at the entropy coding stage varies further when a uniform entropy coding scheme is applied without regard for position of residual levels in the first block that may indicate regions with more compaction in terms of information for the image block.

Further limitations and disadvantages of conventional and traditional approaches will become apparent to one skill in the art, through comparison of described systems with some aspects of the present disclosure, as set forth in the remainder of the present application and with reference to the drawings.

SUMMARY

An embedded codec (EBC) circuitry and a method for position dependent entropy coding of residual level data are provided, substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Various embodiments of the present disclosure may be found in a method and embedded codec (EBC) circuitry for position dependent entropy coding of residual level data. The EBC circuitry may include a memory and encoder circuitry that may handle a generation of a bit-stream of encoded image block by application of a sequential encoding scheme on an image block. The disclosed EBC circuitry may be configured to encode quantized-transformed residual levels in a block based on classification of the quantized-transformed residual levels into two different sets. With classification, different sets of quantized-transformed residual levels may be suitably encoded by different entropy coding schemes, which may also account for variations in the bitrate for the bit-stream. The application of suitable entropy coding schemes based on position of the quantized-transformed residual level in the first block may cause generation of codes that are efficient in terms of a number of bits required per sample and a bit rate for the bit-stream of encoded image block. The application of position-dependent entropy coding schemes at the sub-block level may further reduce a number of bits that are conventionally required to encode an image block.

For example, a first set of quantized-transformed residual levels may be encoded by application of Huffman entropy coding scheme, which may select a Huffman table from a set of Huffman tables. The selection of Huffman table may depend on a position of the quantized-transformed residual level in the block and also depend on the absolute value of the previously coded quantized-transformed residual levels. For the second set of quantized-transformed residual levels, a kth order exponential-Golomb coding scheme may be used.

Figure 1:
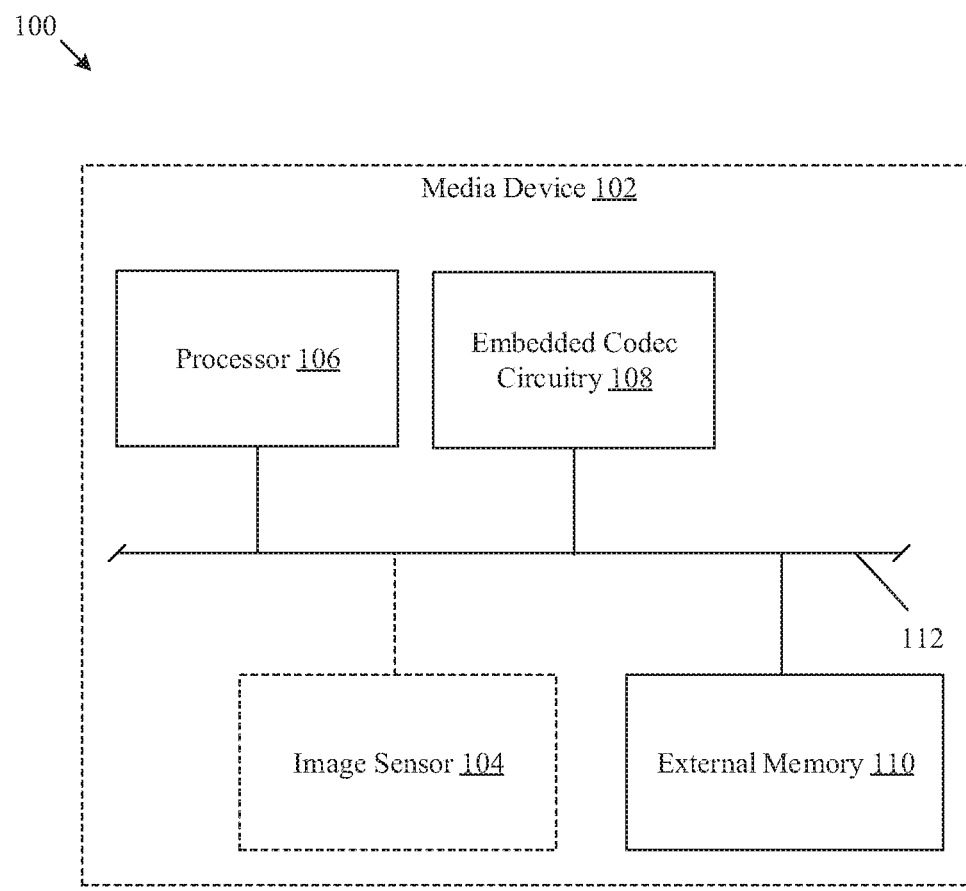
FIG. 1 is a block diagram that illustrates an exemplary media device with an embedded codec (EBC) circuitry and other circuitries for position dependent entropy coding of residual level data, in accordance with an embodiment of the disclosure.

FIG. 1 is a block diagram that illustrates an exemplary media device with an embedded codec (EBC) circuitry and other circuitries for position dependent entropy coding of residual level data, in accordance with an embodiment of the disclosure. With reference to FIG. 1, there is shown a media device 102 that includes a processor 106, an embedded codec (EBC) circuitry 108, and an external memory 110. In some embodiments, an image sensor 104 may be communicatively coupled to with the processor 106, the EBC circuitry 108, and the external memory 110. There is further shown a system bus 112 that interconnects the image sensor 104, the processor 106, the EBC circuitry 108, and the external memory 110.

The media device 102 may comprise suitable logic, circuitry, interfaces that may be configured to store uncompressed raw images and/or videos as encoded (i.e. compressed) images and/or videos in the external memory 110. The media device 102 may be further configured to manage encoding as well as decoding of media content (for example, encoded images and/or videos) and further playback of the decoded media content at a display screen interfaced with the media device 102. The media device 102 may include a dedicated on-chip codec circuitry (such as the EBC circuitry 108), and the external memory 110 for storage of images (raw uncompressed or encoded), along with other computational circuitries for an offline (without network) encoding of the media content at the media device 102. In some embodiments, the media device 102 may also include one or more image sensors (such as the image sensor 104) to capture images in a raw image file format (e.g., raw images with 14-bits of bit depth), which is an uncompressed file format. In such cases, the captured image may be encoded by the EBC circuitry 108 of the media device 102. Examples of the media device 102 may include, but are not limited to, a digital camera, a portable communication device (e.g. laptops, smartphones, tablets, phablets, smart watches, smart glasses, etc.), a media server, a workstation, a desktop computer, and augmented reality/Virtual Reality/Mixed Reality (AR/VR/MR) devices.

Although not shown in FIG. 1, the media device 102 may also include a network interface that may be configured to manage sharing of encoded and/or raw uncompressed images and/or videos with other peripheral or peer-connected devices, through a communication network (not shown in FIG. 1). The detailed description of the network interface and the communication network has been omitted from the present disclosure for the sake of brevity.

The image sensor 104 may comprise suitable logic, circuitry, and interfaces that may be configured to capture a raw uncompressed image or a sequence of raw uncompressed images of a scene in a field-of-view (FOV) of the image sensor 104. The image sensor 104 may be implemented as an active pixel sensor, such as a complementary-metal-oxide semiconductor (CMOS) sensor. In some embodiments, instead of an active pixel sensor, the image sensor 104 may be implemented as one of a passive pixel sensor (such as a charged coupled device (CCD) sensor, an oversampled binary image sensor, a planar Fourier capture array (PFCA), a back-illuminated (BSI or BI) sensor, and the like. Although not shown, the image sensor 104 may also include a specialized microprocessor (or a microcontroller) that is configured to operate in accordance with image data from the image sensor 104, a graphic processing unit (GPU) to process images stored in a frame buffer, and/or a memory integrated with the image sensor 104.

The processor 106 may comprise suitable logic, circuitry, and interfaces that may be configured to execute defined instructions stored in a dedicated memory (e.g., the external memory 110 or an on-chip memory in the EBC circuitry 108). The processor 106 may be implemented based on a number of processor technologies known in the art. Examples of the processor 106 may include, but are not limited to, a Graphical Processing Unit (GPU), a co-processor (such as a specialized image co-processor) for a processor, a specialized digital signal processor, a Central Processing Unit (CPU), an x86-based processor, an x64-based processor, a Reduced Instruction Set Computing (RISC) processor, an Application-Specific Integrated Circuit (ASIC) processor, a Complex Instruction Set Computing (CISC) processor.

The EBC circuitry 108 may comprise suitable logic, circuitry, and interfaces that may be configured to encode a plurality of image blocks (e.g., 16×9 image blocks or 8×4 image blocks), as per a specific compression factor and further decode the encoded plurality of image blocks, in response to instructions received at the EBC circuitry 108. The plurality of image blocks may be part of an input image (i.e. a raw uncompressed image) or a two dimensional (2D) pixel array retrieved from the image sensor 104, following a scan by the image sensor 104. The EBC circuitry 108 may further manage storage of a bit-stream of encoded image block(s) in the external memory 110 or may manage transfer of the bit-stream of encoded image block(s) to other media devices (e.g., a portable media player), via dedicated communication networks.

The EBC circuitry 108 may be implemented as a specialized hardware encoder/decoder interfaced with other computational circuitries of the media device 102. In such implementation, the EBC circuitry 108 may be associated with a specific form factor on a specific computational circuitry. Examples of the specific computational circuitry may include, but are not limited to, a field programmable gate array (FPGA), programmable logic devices (PLDs), an application specific integrated circuit (ASIC), a programmable ASIC (PL-ASIC), application specific integrated parts (ASSPs), and a System-on-Chip (SOC) based on standard microprocessors (MPUs) or digital signal processors (DSPs). In accordance with another embodiment, the EBC circuitry 108 may be also interfaced with a graphical processing unit (GPU) to parallelize operations of the EBC circuitry 108. In accordance with yet another embodiment, the EBC circuitry 108 may be implemented as a combination of programmable instructions stored in a memory and logical units (or programmable logic units) on a hardware circuitry of the media device 102.

The external memory 110 may comprise suitable logic, circuitry, and interfaces that may be configured to store an input image (uncompressed raw or encoded) or a sequence of input images. The external memory 110 may be further configured to act as an image buffer to store raw uncompressed image blocks (2D) retrieved from the image sensor 104. Additionally, the external memory 110 may store instructions associated with sequential encoding/decoding schemes that may be selectively applied, by the EBC circuitry 108, to generate a bit-stream of encoded image block(s). In an exemplary embodiment, the external memory 110 may be dynamic random access memory (DRAM) circuits that may be externally interfaced with the EBC circuitry 108. In another exemplary embodiment, the external memory 110 may be static random access memory (SRAM) circuits that may be externally interfaced with the EBC circuitry 108. Further examples of implementation of the external memory 110 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, or a Secure Digital (SD) card.

Although not shown in FIG. 1, the media device 102 may further include a video codec that may be implemented by known codec standards that may include Advanced Video Codec (AVC)/Media Experts Group (MPEG-4/AVC) or H.264, MPEG-4/HEVC or H.265, and the like. Additionally, the video codec may be supported by other codec libraries that may include FFmpeg, Xvid, DIVx, VP1-9, Windows Media Codec, FFays, and the like.

The system bus 112 may be a hardware bus that may include a set of data channels (or conductive paths) coupled to different components of the media device 102. Alternatively stated, the system bus 112 may interconnect at least data ports, address ports, and control signal ports of different components of the media device 102. For example, the system bus 112 may interconnect the image sensor 104, the processor 106, the EBC circuitry 108, the external memory 110, and other circuitries to each other. The system bus 112 may be configured to facilitate a serial data communication or parallelized data communication between different components on-board the media device 102. Examples of the system bus 112 may include an 8-bit parallel single system bus, a 16-bit parallel single system bus, a 32-bit parallel single system bus, a 64-bit parallel single system bus, a serial data bus, and the like.

In operation, a plurality of image blocks (i.e. 2D image blocks) of an input image may be received by the external memory 110 of the media device 102. In some embodiments, a first image block may be retrieved from a plurality of image blocks sequentially from an on-chip image sensor (such as the image sensor 104) or a camera device that be connected to the media device 102. In other embodiments, a plurality of image blocks may be retrieved from a logical partition of an uncompressed raw image stored in a persistent storage of the media device 102 or received externally from other media storage devices, such as cameras, data servers, etc.

The EBC circuitry 108 may be configured to receive the first image block from the plurality of image blocks sequentially from the external memory 110 or the image sensor 104. The EBC circuitry 108 may be configured to execute a sequential encoding scheme on the first image block to generate a bit-stream of encoded image block. Similarly, the EBC circuitry 108 may be configured to execute a sequential encoding scheme on the plurality of image blocks, to generate a bit-stream of compressed image data of the input image. The bit-stream of compressed image data may include the generated bit-stream of encoded image block. The bit-stream of compressed image data may include header information that may indicate the sequential encoding scheme applied at an encoding stage of the plurality of image blocks to obtain the bit-stream of compressed image data. The sequential encoding scheme may include a sequential application of a forward transform, followed by quantization, a residual prediction, and one or more entropy coding schemes. In the sequential encoding scheme, the EBC circuitry 108 may be further configured to select a first image block from the plurality of image blocks of an input image. Thereafter, the EBC circuitry 108 may be configured to apply a forward transform on the first image block, to generate a plurality of transform coefficients.

In accordance with an embodiment, the forward transform may include a sequential application of a one-dimensional row direct cosine transform (1D row DCT) transformation and a 1D column DCT on the first image block of the plurality of image blocks of the input image. The sequential application of 1D row DCT followed by a 1D column DCT may be referred to as a row-column DCT method. In the row-column DCT method, a 2D DCT may be computed for the first image block by the sequential application of 1D row DCT and 1D column DCT. Here, the application of the 1D row DCT may correspond to an application of a 1D DCT transform on each row of the first image block to generate a plurality of row-wise transformed coefficients and the application of the 1D column DCT may correspond to application of 1D DCT on each column of the block of row-wise transformed coefficients to generate the plurality of transform coefficients.

In accordance with an embodiment, the forward transform may be based on a family of sinusoidal unitary transforms (that includes a family of orthonormal bases or eigenvectors). Examples of the 1D forward transform may include, but are not limited to, type I-VIII Discrete Cosine Transform (DCT), type I-VIII Discrete Sine Transform (DST), Discrete Wavelet Transform (DWT), and a Dual-Tree Complex Wavelet Transform (DCWT).

In accordance with an embodiment, the first image block may be represented as a combination a luminance image block, a Chroma-Blue image block, or a Chroma-Red image block in YCbCr color space. In such a case, the EBC circuitry 108 may be configured to separately apply a forward transform, such as the row-column DCT method, on the luminance image block, the Chroma-Red image block, and a Chroma-Blue image block to generate a luma block, a Chroma-U block, and a Chroma-V block of transform coefficients, respectively.

The EBC circuitry 108 may be further configured to quantize a plurality of transform coefficients for the first image block to generate a plurality of quantized-transformed levels. Similarly, a plurality of transform coefficients for image blocks other than the first image block may be further quantized to generate a corresponding plurality of quantized-transformed levels. Thus, the EBC circuitry 108 may be configured to generate a plurality of blocks of quantized-transformed levels after a sequential quantization of a plurality of transform coefficients for each image block of the plurality of image blocks.

In accordance with an embodiment, the EBC circuitry 108 may be configured to quantize a plurality of transform coefficients in each of the luma block, the Chroma-U block, and the Chroma-V block to generate a corresponding plurality of quantized-transformed levels. The plurality of quantized-transformed levels may be separated from each other by a plurality of discretized quantization bins. A step size for the plurality of quantization bins may be further selected adaptively (or uniformly) to efficiently quantize a 1D sub-block of transform coefficients into a plurality of quantized-transformed levels. Each quantized-transformed level may be a mid-value from an upper bound and a lower bound of a quantization bin, for example, a quantization bin of "(155,175)" may include a quantized-transformed level of "(155+175)/2", i.e. "165". With quantization, the EBC circuitry 108 may remove redundant coefficient information from transform domain data (i.e. the plurality of transform coefficients for the first image block) without a visually noticeable degradation of quality.

The plurality of quantization bins may be determined based on a quantization parameter (QP), which may vary with a defined rate in accordance with an adaptive quantization scheme to encode or decode the media content. The QP may vary from 0 to a bit depth of a bit-stream of encoded image block (i.e. a 2D image block). For example, a QP for an 8-bit bit-stream of compressed image block may be selected as "7" for a first block of transform coefficients and "0" for a second block of transform coefficients, which may imply that the first block of transform coefficients may be quantized with a finer step size than the second block and the second block may not be quantized at all.

The EBC circuitry 108 may be further configured to apply a residual prediction scheme on the plurality of blocks of quantized-transformed levels, where each block may include a plurality of quantized-transformed levels for a corresponding 2D image block, such as the first image block. After application of the residual prediction scheme, a plurality of blocks of quantized-transformed residual levels may be obtained from the plurality of blocks of quantized-transformed levels. In accordance with an embodiment, the EBC circuitry 108 may be configured to apply a residual prediction scheme selectively on a plurality of quantized-transformed levels in the luma block, the Chroma-U block, and the Chroma-V block for the first image block of the plurality of image blocks. As an example, the selective application of the residual prediction scheme may include that only a DC quantized-transformed level(s) of the luma block is Pulse Code Modulation (PCM) coded and all the DC and AC quantized-transformed levels of the Chroma-U and Chroma-V block are PCM coded.

The plurality of blocks of quantized-transformed residual levels for a corresponding plurality of image blocks may be stored in a memory, such as the external memory 110 or an on-chip memory (e.g., a dedicated SRAM or an on-chip cache) in the EBC circuitry 108. Examples of the residual prediction scheme may include, but are not limited to, a PCM scheme, a Differential Pulse Code Modulation (DPCM) scheme, or an Adaptive DPCM (ADPCM) scheme. In DPCM and ADPCM schemes, instead of utilizing each quantized-transformed level, a residue is predicted from reference quantization levels.

The first block may include a plurality of quantized-transformed residual levels, which may further include a DC quantized-transformed residual level and a plurality of AC quantized-transformed residual levels. For example, an "8×8" block of "64" quantized-transformed residual levels may include "1" DC quantized-transformed residual level and "63" AC quantized-transformed residual levels. Here, "DC" and "AC" represents quantized-transformed residual levels that exhibit a zero frequency and a non-zero frequency, respectively. In other words, "DC" represents direct current (DC) term which is a first term in an image block or a sub-block, and thus exhibit a zero frequency and remaining elements are known as alternative current (AC) terms (also referred to as AC values or coefficients) that exhibit a non-zero frequency, well known in image compression domain. Thus, AC quantized-transformed residual levels corresponds to quantized-transformed residual levels of AC coefficients and DC quantized-transformed residual level corresponds to quantized-transformed residual level of the DC coefficient.

In accordance with an embodiment, the EBC circuitry 108 may be configured to compute a histogram distribution of absolute values of a plurality of quantized-transformed residual levels of the first block, in order to entropy encode the plurality of quantized-transformed residual levels in the first block. The histogram distribution may indicate an extent of variation in the absolute values of the plurality of quantized-transformed residual levels in the first block. Alternatively stated, the histogram distribution may include different bins that represent a range of quantized-transformed residual levels and each of the plurality of quantized-transformed residual levels may be allocated to a suitable bin and different bins may indicate a count of quantized-transformed residual levels allocated in the corresponding bins. The histogram distribution may be utilized by the EBC circuitry 108 to classify the plurality of quantized-transformed residual levels in the first block.

The EBC circuitry 108 may be configured to classify the plurality of quantized-transformed residual levels in the first block into a first set of quantized-transformed residual levels and a second set of quantized-transformed residual levels. The classification may be done based on comparison of each quantized-transformed residual level of the plurality of quantized-transformed residual levels with a threshold level value. For example, a first set may include all the quantized-transformed residual levels that have an absolute value that is greater than "5" (i.e. a threshold level value) and a second set may include all the quantized-transformed residual levels that have an absolute value that is less than or equal to 5 (i.e. a threshold level value).

The classification may be a logical classification, where the plurality of quantized-transformed residual levels in the first block may still be processed as a single block without a classification driven rearrangement of quantized-transformed residual levels. At the entropy coding stage, the EBC circuitry 108 may need to detect whether a quantized-transformed residual level at a specific position in the first block belongs to the first set of quantized-transformed residual levels or the second set of quantized-transformed residual levels. While the EBC circuitry 108 is scanning the first block, whenever a quantized-transformed residual level is identified to be from the first set of quantized-transformed residual levels, the EBC circuitry 108 may be configured to apply a first entropy coding scheme (e.g., Huffman entropy coding scheme) on such quantized-transformed residual level. While the EBC circuitry 108 is scanning the first block, whenever a quantized-transformed residual level is identified to be from the second set of quantized-transformed residual levels, the EBC circuitry 108 may be configured to generate a skip code based on the first entropy coding scheme (e.g. Huffman entropy coding scheme). The skip code may act as a trigger code, which when detected (e.g., by an encoder circuitry or a decoder circuitry) indicates that a currently scanned quantized-transformed residual level (or encoded portion of bits) belongs to the second set of quantized-transformed residual levels and has an absolute value greater than the threshold level value. Thereafter, the EBC circuitry 108 may be configured to apply a second entropy coding scheme (e.g., a kth order exp-Golomb entropy coding scheme) on each quantized-transformed residual levels residual level of the second set of quantized-transformed residual levels after the skip code for a corresponding quantized-transformed residual level is generated. The first entropy coding scheme or a combination of the first entropy coding scheme (to generate the skip code) and a second entropy coding scheme may be applied on the plurality of quantized-transformed residual levels in the first block, in accordance with a DC-to-AC scan order followed by the EBC circuitry 108 in the first block. The DC-to-AC scan order may be a scanning sequence in which DC quantized-transformed residual levels may be scanned followed by AC quantized-transformed residual levels in the first block. Thus, the selective application of different entropy coding schemes based on a position of quantized-transformed residual level as per the DC-to-AC scan order in the first block, may be referred to as a position-dependent entropy coding scheme for a plurality of quantized-transformed residual levels in the first block.

The EBC circuitry 108 may be further configured to generate a bit-stream of encoded image block by a selective application of the first entropy coding scheme on the first set of quantized-transformed residual levels and a combination of the first entropy coding scheme and the second entropy coding scheme on the second set of quantized-transformed residual levels. The skip codes may be a part of the bit-stream and may precede a code (a set of bits that represent a quantized-transformed residual level) associated with a quantized-transformed residual level that may belong to the second set of quantized-transformed residual levels.

For example, a "4×4" block may include "16" quantized-transformed residual levels, of which "9" quantized-transformed residual levels may have an absolute value greater than a threshold level value of "5" and "7" quantized-transformed residual levels may have an absolute value less than or equal to "5". The EBC circuitry 108 may be configured to encode the "9" quantized-transformed residual levels by application of a Huffman entropy coding scheme to generate a bit-stream of "9" Huffman codes (or codes) of "3 bits/code", i.e. a total of "27 bits". As the absolute value of "7" quantized-transformed residual level is above "5", the Huffman code may take more bits to encode such quantized-transformed residual level. Therefore, the EBC circuitry 108 may be configured to generate "2 bits" of skip code and encode a difference of a quantized-transformed residual level and a threshold level value (e.g., "7"–"5" or "2") by application of the exponential-Golomb scheme on the difference of a quantized-transformed residual level (from "7" quantized-transformed residual levels) and a threshold level value. As exp-Golomb entropy coding scheme uses utilizes less bits than other entropy coding schemes to encode small values, "7" quantized-transformed residual levels may be encoded by "3 bits" per level. Thus, the "7" quantized-transformed residual levels may be encoded by "3" bits per level and an additional "2" bits per skip code, i.e. a total of "35" bits. The Huffman code may for the "7" quantized-transformed residual levels may have used more than "5" bits per level and therefore, the position-based entropy coding reduces an amount of bits to encode the first block of quantized-transformed residual levels, which may help to increase a compression factor for the first block of quantized-transformed residual levels.

In accordance with an embodiment, an EBC decoder circuitry (not shown in FIG. 1) of the EBC circuitry 108 may be configured to pre-store different coding tables (e.g., custom coding tables for Huffman entropy coding schemes, exponential-Golomb entropy coding schemes, etc.) and quantization tables. Therefore, the bit-stream of encoded image block may need not include different coding tables and quantization tables. In accordance with an embodiment, the EBC circuitry 108 may be configured to generate a bit-stream of encoded image block such that the bit-stream is decodable by external decoders that may utilize different decoding schemes to decode the bit-stream of encoded image block. In such a case, the EBC circuitry 108 may be configured to add different coding tables (e.g., custom coding tables for Huffman entropy coding schemes, exponential-Golomb entropy coding schemes, etc.) and quantization tables, in header information or a different meta-stream associated with the bit-stream of encoded image block. By addition of such custom tables and quantization tables in the bit-stream, the output of the EBC circuitry 108 may be decodable by other decoder circuitries.

In accordance with an embodiment, the bit-stream of encoded image block may be stored as part of an input image (such as, a 2D image) in the memory, such as the external memory 110 or an on-chip memory in the EBC circuitry 108. The bit-stream of encoded image block may have multiple implementations in different applications. Some of the implementations have been briefly presented herein. In one implementation, the processor 106 may be configured to transfer the bit-stream of encoded 1D image block, via the system bus 112, to a frame buffer (or a frame store) of a display circuitry (e.g., a video card) communicatively coupled (or interfaced) with the system bus 112 of the media device 102. The frame buffer may act as a compressed frame buffer for the display circuitry. The display circuitry (not shown in FIG. 1) may decode and further utilize the bit-stream of image block to display a patch of image onto a display screen of the media device 102. In another implementation, the processor 106 may be configured to transfer the bit-stream of encoded image block, via the system bus 112, to a decoder buffer, such as a decoder picture buffer (DPB) of a video decoder, a buffer memory for an image decoder, or a coded picture buffer (CPB) of a video codec, in the media device 102.

In an exemplary implementation, the media device 102 may be a camera, such as a digital video camera or a digital image camera, and the bit-stream of encoded image block may correspond to a 2D array of pixel values that are directly received from a CMOS sensor in the camera. In a specific scenario, the EBC circuitry 108 may be implemented in the CMOS sensor circuitry. The detailed operation of EBC circuitry 108 has been further described in detail, for example in FIGS. 2, 3, and 4.

Figure 2:
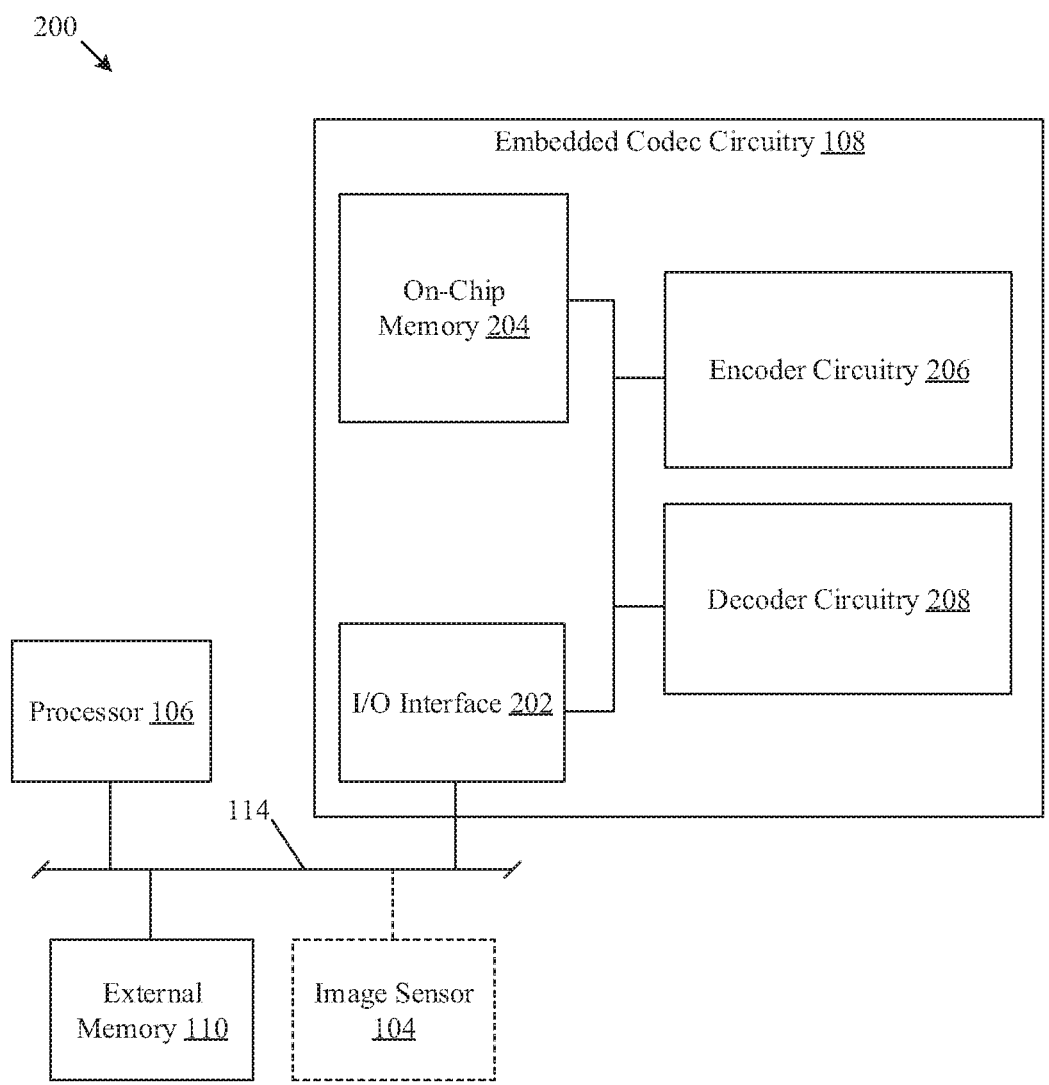
FIG. 2 is a block diagram that illustrates an embedded codec (EBC) circuitry with various peripheral components for position dependent entropy coding of residual level data, in accordance with an embodiment of the disclosure.

FIG. 2 is a block diagram that illustrates an embedded codec (EBC) circuitry with various peripheral components for position dependent entropy coding of residual level data, in accordance with an embodiment of the disclosure. FIG. 2 is explained in conjunction with elements from FIG. 1. With reference to FIG. 2, there is shown a block diagram 200 of the EBC circuitry 108. The EBC circuitry 108 may include an Input/output (I/O) interface 202, an on-chip memory 204, an encoder circuitry 206, and a decoder circuitry 208. In the block diagram 200, there is also shown the image sensor 104, the processor 106, and the external memory 110 communicatively coupled to the EBC circuitry 108, via the system bus 112. In some embodiments, the processor 106 and the external memory 110 may be implemented inside the EBC circuitry 108, without deviation from the scope of the disclosure.

The I/O interface 202 may comprise suitable logic, circuitry, and interfaces that may be configured to manage a plurality of I/O ports to facilitate exchange of communication data from other peripheral circuitries, via the system bus 112, for example, the external memory 110, the processor 106, or the image sensor 104. The communication data may include a bit-stream of the encoded image block, control signals, CPU instructions, and the like. The configuration of the I/O ports may depend on a specification of the EBC circuitry 108, for example, physical I/O pins in an ASIC, FPGA or a SoC chip.

The on-chip memory 204 may comprise suitable logic, circuitry, and interfaces that may be configured to store different operational data (e.g., transform domain data, residual levels, quantization levels, entropy coded bits, etc.) that may be utilized by different components of the EBC circuitry 108 to encode the image block. Examples of the operational data that the on-chip memory 204 may be configured to store may include, but are not limited to, a bit-stream of encoded image block, transform-domain data, quantized-transformed levels, quantized-transformed residual levels, and 1D/2D image blocks. The on-chip memory 204 may be implemented as a specific memory designed with a defined memory specification, such as R/W speed, memory size, fabrication factors, and the like. Examples of the on-chip memory 204 may include, but are not limited to, static random access memory (SRAM), dynamic access memory (DRAM), and Static Dynamic RAM (SD-RAM).

The encoder circuitry 206 may comprise suitable logic, circuitry, and interfaces that may be configured to generate a bit-stream of encoded image block by application of a sequential encoding scheme (includes a position-dependent entropy coding scheme) on the image block, stored in a memory, such as the on-chip memory 204 or the external memory 110. The encoder circuitry 206 may be optimized to reduce a number of bits that may be used to encode a block of quantized-transformed residual levels (corresponds to an image block) to improve a compaction efficiency and/or a compression factor of the inputted image block. In some embodiments, the encoder circuitry 206 may be a hardware encoder chip that may be implemented based on one of ASIC, programmable logic devices (PLDs), SOC, FPGA, digital signal processors (DSPs) or other specialized circuitries. In other embodiments, the encoder circuitry 206 may be implemented as a combination of hardware and stored set of instructions in the on-chip memory 204 (for example, instructions based on VHDL or HDL logic).

The decoder circuitry 208 may comprise suitable logic, circuitry, and interfaces that may be configured to decode a bit-stream of encoded image block based on header information and a set of skip codes in the bit-stream that triggers classification of quantized-transformed residual levels into different sets, such as a first set of quantized-transformed residual levels and a second set of quantized-transformed residual levels. The decoder circuitry 208 may have pre-stored quantization tables and coding tables that may act as a reference for the decoder circuitry 208 to decode the bit-stream of encoded image block. In some embodiments, the decoder circuitry 208 may be a hardware encoder chip that may be implemented based on one of ASIC, programmable logic devices (PLDs), SOC, FPGA, digital signal processors (DSPs) or other specialized circuitries. In other embodiments, the decoder circuitry 208 may be implemented as a combination of hardware and stored set of instructions in the on-chip memory 204 (for example, instructions based on VHDL or HDL logic).

In operation, a plurality of blocks of quantized-transformed residual levels may be generated from a plurality of image blocks of an input image and further stored in the memory, such as the external memory 110 or the on-chip memory 204. The plurality of blocks may be a residual level data that corresponds to the plurality of image blocks, also referred to as patches of an input image. The plurality of blocks of quantized-transformed residual levels may be generated based on a sequential application of a 1D forward transform, followed by a quantization, and a residual prediction for a plurality of blocks of the quantized-transformed levels. For example, a "1280×720" input image has "80" "16×9" image blocks. The encoder circuitry 206 may be configured to generate a plurality of "16×9" blocks of quantized-transformed residual levels by a sequential application of a "16×1" row DCT-II transform, a "16×1" column DCT-II transform on each "16×9" image block of the "80" image blocks, a quantization with a quantization parameter of "7", and followed by a PCM coding of quantized-transformed levels in each "16×9" block of the "80" image blocks.

In order to entropy encode the plurality of blocks of quantized-transformed residual levels, the encoder circuitry 206 may be configured to retrieve a first block of the plurality of blocks from the memory, such as the external memory 110 or the on-chip memory 204. The first block may include a DC quantized-transformed residual level and a plurality of AC quantized-transformed residual levels, for example, a "16×16" block may have one DC quantized-transformed residual level and "15" AC quantized-transformed residual levels.

In certain embodiments, the first block is a luma block when a corresponding image block is a luminance image block and the first block is a chroma-U or a chroma-V block when a corresponding image block is a chroma image block. Also, for a first RGB image block, the encoder circuitry 206 may be configured to transform the RGB (or BGR) image block into a luma block, a chroma-U block, and a chroma-V block. The absolute value of the AC quantized-transformed residual levels in the luma block, the chroma-U block, or the chroma-V block may vary in accordance with a pattern, which may indicate specific regions that have high frequency AC quantized-transformed residual levels and low frequency AC quantized-transformed residual levels.

The position of the DC and AC quantized-transformed residual levels in the first block may be based on a direction (e.g., a scan order) selected for a successive application of 1D row transform and a 1D column transform on the plurality of pixel values in a first image block (corresponding to the first block). For example, an application of a 1 D-row DCT transform may generate a DC transform coefficient at a first position and remaining AC transform coefficients at subsequent positions in different rows of the first block. Similarly, a successive application of a 1 D-column DCT transform after an application of 1D row transform may generate a DC transform coefficient at a first position and remaining AC transform coefficients at subsequent positions in different columns of the first block.

The encoder circuitry 206 may be configured to classify a plurality of quantized-transformed residual levels in the first block of the plurality of blocks, into a first set of quantized-transformed residual levels and a second set of quantized-transformed residual levels. The classification of the plurality of quantized-transformed residual levels may be done based on comparison of each quantized-transformed residual level of the plurality of quantized-transformed residual levels with a threshold level value. The comparison may correspond to a check whether an absolute value of each quantized-transformed residual level of the plurality of quantized-transformed residual levels in the first block is less than, equal to or greater than the threshold level value. In accordance with an embodiment, an absolute value of each quantized-transformed residual level of the first set of quantized-transformed residual levels may be less than or equal to the threshold level value. In accordance with an embodiment, an absolute value of each quantized-transformed residual level of the second set of quantized-transformed residual levels is greater than the threshold level value.

In accordance with an embodiment, the encoder circuitry 206 may be configured to generate a histogram distribution of the plurality of quantized-transformed residual levels in the first block (e.g. the luma block, the chroma-U block or the chroma-V block). The histogram distribution may have a plurality of bins, for example, a first bin may have a range of "[0, 5]" (inclusive of "5") for an absolute value of quantized-transformed residual levels. Subsequent bins may cover the absolute value of the quantized-transformed residual levels that lie above the range of "[0, 5]". The encoder circuitry 206 may be configured to classify quantized-transformed residual levels that may have absolute values within a range of the first bin, into the first set of quantized-transformed residual levels. Similarly, the encoder circuitry 206 may be configured to classify quantized-transformed residual levels that may have absolute values above a range of the first bin, into the second set of quantized-transformed residual levels.

The encoder circuitry 206 may be further configured to apply a first entropy coding scheme on the first set of quantized-transformed residual levels, and a combination of the first entropy coding scheme and a second entropy coding scheme on the second set of quantized-transformed residual levels. The application of the first entropy coding scheme or the combination of the first entropy coding scheme and the second entropy coding scheme may be executed in a DC-to- AC scan order in the first block. The DC-to-AC scan order in the first block may be a scanning sequence in which DC quantized-transformed residual levels may be scanned followed by AC quantized-transformed residual levels in the first block. More specifically, by following the DC-to-AC scan order, the encoder circuitry 206 may be configured to switch between the first entropy coding scheme and the second entropy coding scheme. The switch may be based on a position of the quantized-transformed residual level (DC or AC) in the first block and whether a quantized-transformed residual level at a specific position in the first block lies in the first set of quantized-transformed residual levels or the second set of quantized-transformed residual levels.

In accordance with an embodiment, the first entropy coding scheme may be a Huffman entropy coding scheme and the second entropy coding scheme may be an exp-Golomb entropy coding scheme. The encoder circuitry 206 may be further configured to encode the first set of quantized-transformed residual levels based on a set of pre-specified Huffman tables. The first set of quantized-transformed residual levels may be entropy coded in accordance with the Huffman entropy coding scheme. The set of pre-specified Huffman tables may include a first set of default Huffman tables and a second set of position-specific Huffman tables.

In accordance with an embodiment, the set of pre-specified Huffman tables may include a first position-specific Huffman table ("$T_0$"), a second position-specific Huffman table ("$T_1$"), a third position-specific Huffman table ("$T_2$"). Also, the set of pre-specified Huffman tables may include a first default Huffman table ("$T_3$") for a luma block, and a second default Huffman table ("$T_4$") for a chroma-U or a chroma-V block. Table 1 shows the set of pre-specified Huffman tables, as follows:

TABLE 1

Pre-specified Huffman Tables

| Level | $T_0$ | $T_1$ | $T_2$ | $T_3$ | $T_4$ |
|---|---|---|---|---|---|
| 0 | 0 | 10 | 0 | 10 | 0 |
| 1 | 10 | 0 | 110 | 10 | 10 |
| −1 | 110 | 1 | 111 | 11 | 11 |
| Abs (2) | 1111 | 110 | 1 | 110 | 10 |
| Abs (3) | 11101 | 1111 | 101 | 0 | 11 |
| Abs (4) | 111001 | 11101 | 1001 | 1111 | 100 |
| Abs (5) | 1110001 | 111001 | 10001 | 1110 | 101 |
| Skip Code | 1110000 | 111000 | 10000 | 1 | 11 |

In Table 1, Huffman codes for different quantized-transformed residual levels, i.e. "0", "1", "−1", abs("2"), abs ("3"), abs("4"), and abs("5"), have been provided in $T_0$, $T_1$, $T_2$, $T_3$, and $T_4$, respectively. Additionally, Huffman codes for a skip code that is generated when a detected quantized-transformed residual level at a specific position in the DC-to-AC scan order in the first block is greater than a threshold value (e.g., a threshold value of "5"). The selection of the default Huffman tables and position-specific Huffman tables may be done based on different rules followed at the entropy coding stage by the encoder circuitry 206. The rules have been discussed herein.

In accordance with an embodiment, the encoder circuitry 206 may be configured to select a default Huffman table from the first set of default Huffman tables (e.g., as shown in Table 1, $T_3$ or $T_4$) to encode the first set of quantized-transformed residual levels, in accordance with the DC-to-AC scan order in the first block. The first set of default Huffman tables may be selected as default tables whenever a quantized-transformed residual level is selected at the entropy coding stage from the luma block and chroma (U or V) blocks. In case the first set of default Huffman tables are selected, the quantized-transformed residual level at different positions may be coded by a Huffman code listed corresponding to the absolute value of the quantized-transformed residual level in the first block.

In accordance with an embodiment, a default Huffman table may be selected from the first set of default Huffman tables (e.g., $T_3$ or $T_4$, as shown in Table 1) to generate a Huffman code for a specific quantized-transformed residual level at a current position in the first block, whenever an absolute value of the previously coded quantized-transformed residual level is greater than the threshold level value, such as "5". In accordance with an embodiment, the encoder circuitry 206 may be further configured to select a position-specific Huffman table from the second set of position-specific Huffman tables (e.g., as shown in Table 1, $T_0$, $T_1$, and $T_2$), based on a specific position of each quantized-transformed residual level in the first block. The position-specific Huffman table may be selected to encode the first set of quantized-transformed residual levels, in accordance with the DC-to-AC scan order in the first block.

For example, a "4×4" block of quantized-transformed residual levels may be given, as follows:

$$B = \begin{bmatrix} -21 & 1 & 2 & 0 \\ 6 & 7 & 1 & 0 \\ 5 & 5 & 1 & 0 \\ 3 & 0 & 0 & 0 \end{bmatrix}$$

In the block (B), there are "4×4", i.e. "16" quantized-transformed residual levels, where the first quantized-transformed residual level is a DC quantized-transformed residual level with a value of "−21" and remaining quantized-transformed residual levels are AC quantized-transformed residual levels. In order to entropy code the block (B), the plurality of quantized-transformed residual levels in the block (B) are classified into a first set and a second set. The first set may have absolute value of quantized-transformed residual levels less than or equal to "5", i.e. "0, 0, 0, 0, 0, 0 1, 1, 1, 2, 3, 5, and 5". Similarly, the second set may have absolute values of quantized-transformed residual levels greater than "5", i.e. "6, 7, and 21".

The encoder circuitry 206 may be configured to scan the block (B) in a DC-to-AC scan order, which may specify a sequence (or a position) in which quantized-transformed residual levels may be accessed by the encoder circuitry 206 in the block (B). Thereafter, the encoder circuitry 206 may be configured to selectively apply the Huffman entropy coding scheme or a combination of the Huffman entropy coding scheme and the exp-Golomb entropy coding scheme, based on whether at the current position, the quantized-transformed residual level is from the first set or the second set. In a case, where at the current position, the quantized-transformed residual level is part of the first set, the encoder circuitry 206 may be configured to generate a Huffman code for the quantized-transformed residual level based on the default Huffman table (e.g., in case the Block (B) is a luma Block or a chroma block).

In accordance with an embodiment, in the DC-to-AC scan order, the encoder circuitry 206 may be configured to identify that the quantized-transformed residual level at the current position in the first block may be part of the second set of quantized-transformed residual levels. In such cases, the encoder circuitry 206 may be further configured to generate a skip code for each quantized-transformed residual level of the second set of quantized-transformed residual levels, in accordance with the first entropy coding scheme, for example, the Huffman entropy coding scheme. The skip code may be generated to allow the decoder circuitry 208 to classify, at the decoding stage, each quantized-transformed residual level into the first set of quantized-transformed residual levels or the second set of quantized-transformed residual levels.

After the skip code has been generated, the encoder circuitry 206 may be configured to encode the second set of quantized-transformed residual levels, based on the application of the second entropy coding scheme (e.g., exp-Golomb entropy coding scheme) on the second set of quantized-transformed residual levels. The exp-Golomb entropy coding scheme may be a kth order exp-Golomb entropy coding scheme, where the value of k may be pre-defined or adapted based on content of the image block. Each quantized-transformed residual level may be encoded after the generation of a skip code for each quantized-transformed residual level of the second set of quantized-transformed residual levels. The successive generation of the skip code followed by the encoded code for each quantized-transformed residual level in the second set of quantized-transformed residual levels may correspond to the application of the combination of the first entropy coding scheme and the second entropy coding scheme.

In some embodiments, as shown in Table 1, for a quantized-transformed residual level in the second set of quantized-transformed residual levels, the skip code may be generated based on the set of pre-specified Huffman tables (referred to as an application of the Huffman entropy coding scheme). Thereafter, the encoder circuitry 206 may be configured to generate an exp-Golomb code for the same quantized-transformed residual level. Alternatively, as the skip code already indicates that the quantized-transformed residual level is above a threshold level value (e.g., "5"), the encoder circuitry 206 may be configured to generate the exp-Golomb code for an absolute difference between the quantized-transformed residual level and the threshold level value. Thus, whenever a skip code for an encoded quantized-transformed residual levels is detected at the decoding stage, the decoder circuitry 208 may be configured to treat the exp-Golomb code as an absolute difference between a real value of quantized-transformed residual level and a threshold level value. Additionally, as the exp-Golomb code may be decoded, an addition of the threshold level value may again return the real value of the quantized-transformed residual levels. In such cases, the implementation of the exp-Golomb entropy coding scheme may cause a utilization of a lesser number of bits as compared to Huffman entropy coding scheme, especially when the input to the encoder circuitry 206 for application of the exp-Golomb entropy coding scheme includes smaller input values (e.g., typically in a range of "0-3").

The encoder circuitry 206 may be further configured to generate a bit-stream of encoded image block by application of the first entropy coding scheme and the combination of the first entropy coding scheme and the second entropy coding scheme in accordance with the DC-to-AC scan order followed in the first block. In some embodiments, the generated bit-stream may be stored in the memory, such as the on-chip memory 204 and the external memory 110, for use at a later stage in the media device 102. In other embodiments, the generated bit-stream may be directly transmitted to the decoder circuitry 208 inside the EBC circuitry 108 or an external video codec or image codec circuitry. The details of the encoder circuitry 206 and implemented entropy coding schemes have been further described in detail, for example, in FIGS. 3A, 3B, 4A, and 4B.

Figure 3A:
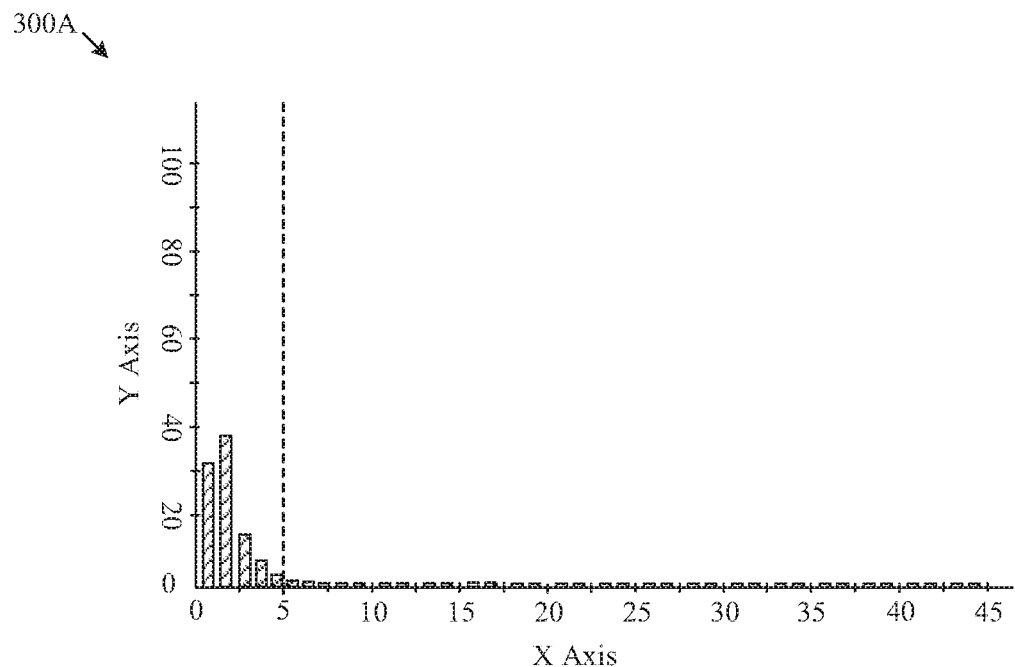
FIGS. 3A and 3B, collectively, depict a first histogram distribution and a second histogram distribution for a block of quantized-transformed residual levels of an input image block, in accordance with an embodiment of the disclosure.
Figure 3B:
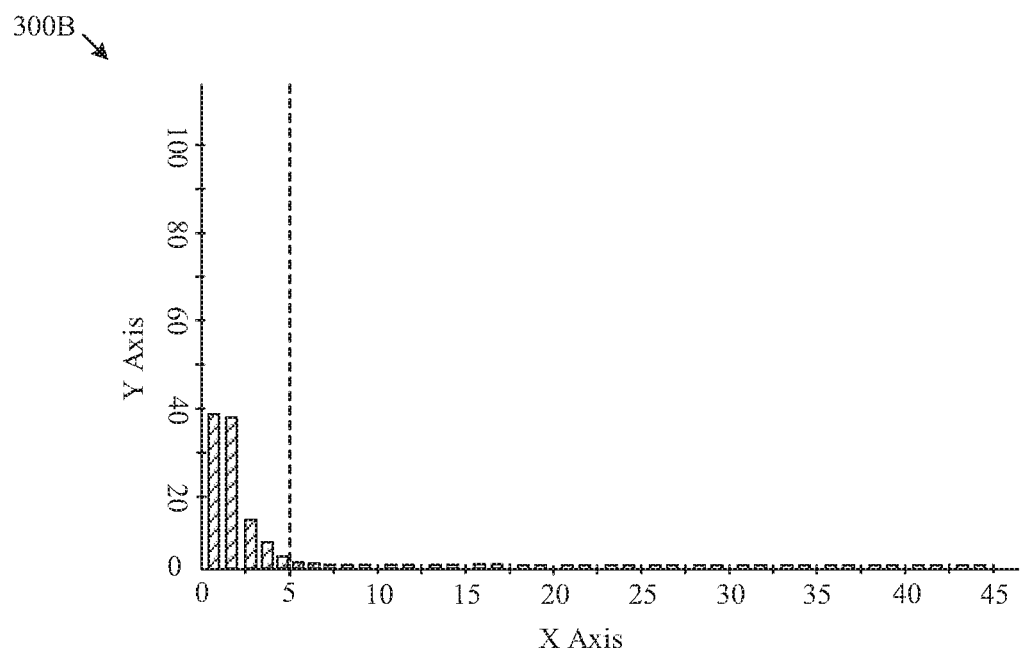

FIGS. 3A and 3B, collectively, depict a first histogram distribution and a second histogram distribution for a block of quantized-transformed residual levels of an input image block, in accordance with an embodiment of the disclosure. With reference to FIGS. 3A and 3B, there is shown a first histogram distribution 300A and a second histogram distribution 300B.

With reference to FIG. 3A, the encoder circuitry 206 may be configured to scan a luma block (i.e. the first block) of quantized-transformed residual levels (as per a DC-to-AC scan order) in order to generate the first histogram distribution 300A at specific bits per sample, such as "4" bits per sample. The first histogram distribution 300A may provide a count of quantized-transformed residual levels (represented along Y axis) of a Luma block (i.e. the first block) into different histogram bins (represented along X axis) of a specific bin size, such as "5". As shown, after application of 1D row DCT transform and 1D column DCT transform, the maximum number of quantized-transformed residual levels lie in the range of "0 to 5" and the remaining number of quantized-transformed residual levels lie above the value of "5". Thus, based on the histogram distribution, the encoder circuitry 206 may be configured to set a threshold level value, such as "5". In the luma block, all the quantized-transformed residual levels that are less than or equal to "5" may be subjected to application of the Huffman entropy coding scheme. The remaining quantized-transformed residual levels may be subjected to application of the Huffman entropy coding scheme to generate a skip code, which may uniquely indicate presence of a quantized-transformed residual level (at the decoder circuitry 208 or the encoder circuitry 206) that has an absolute value above the threshold level value of "5". Thereafter, for each skip code for a corresponding quantized-transformed residual level, the encoder circuitry 206 may be configured to generate an exp-Golomb code for the corresponding quantized-transformed residual level in the luma block.

With reference to FIG. 3B, the encoder circuitry 206 may be configured to scan a chroma block (i.e. the first block) of quantized-transformed residual levels (as per a DC-to-AC scan order) in order to generate the second histogram distribution 300B at specific bits per sample, such as "4" bits per sample. The second histogram distribution 300B may provide a count of quantized-transformed residual levels (represented along Y axis) of a chroma-U or a chroma-V block into different histogram bins (represented along X axis) of a specific bin size, such as "5". As shown, after application of 1D row DCT transform and 1D column DCT transform, the maximum number of quantized-transformed residual levels lie in the range of "0 to 5" and the remaining number of quantized-transformed residual levels lie above the value of "5". Thus, based on the histogram distribution, the encoder circuitry 206 may be configured to set a threshold level value, such as "5". In the chroma block, all the quantized-transformed residual levels that are less than or equal to "5" may be subjected to application of the Huffman entropy coding scheme. The remaining quantized-transformed residual levels may be subjected to application of the Huffman entropy coding scheme to generate a skip code, which may uniquely indicate presence of a quantized-transformed residual level (at the decoder circuitry 208 or the encoder circuitry 206) that has an absolute value above the threshold level value of "5". Thereafter, for each skip code for a corresponding quantized-transformed residual level, the encoder circuitry 206 may be configured to generate an exp-Golomb code for the corresponding quantized-transformed residual level in the luma block.

Figure 4A:
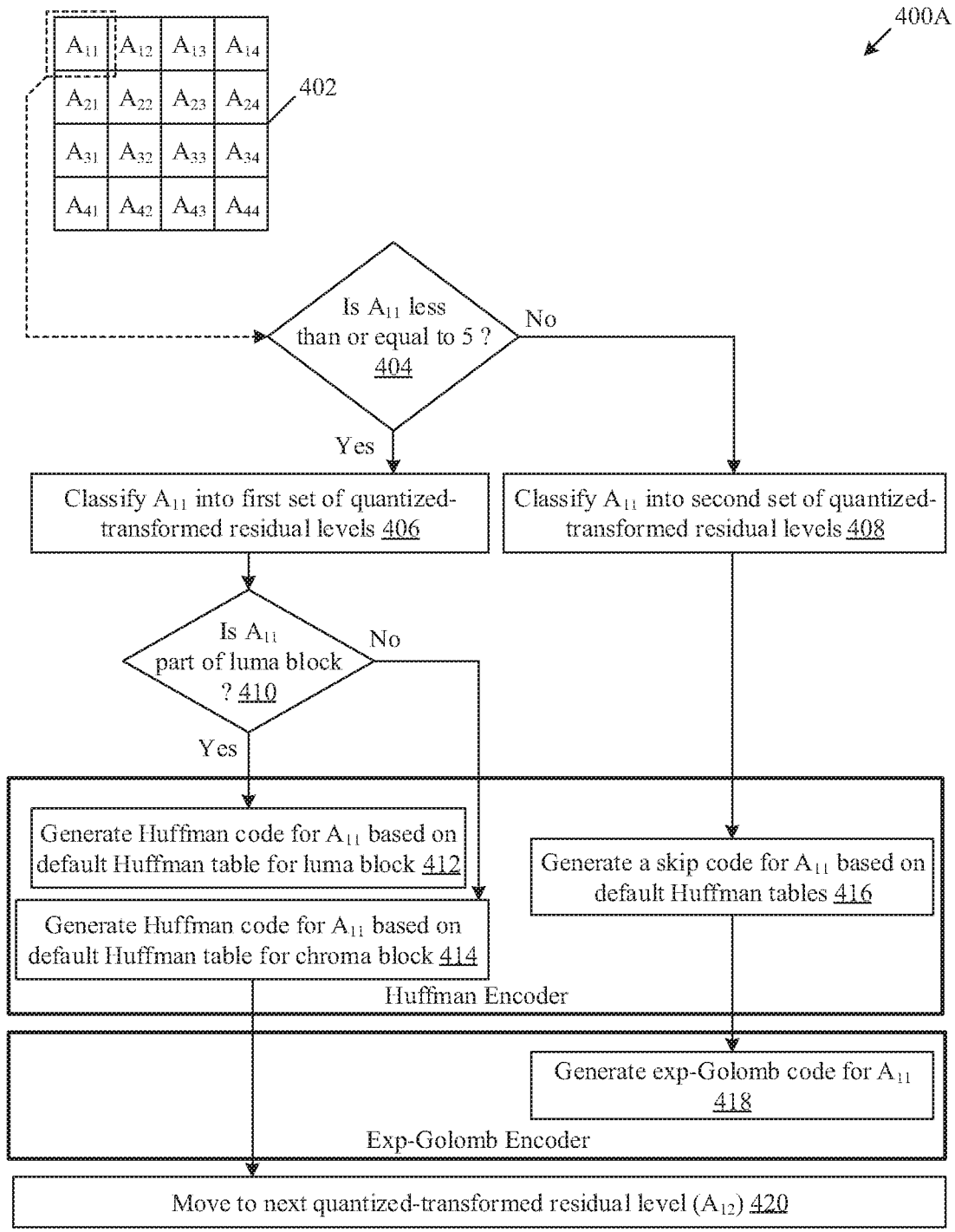
FIG. 4A is a flow diagram that illustrates exemplary operations for position dependent entropy coding of residual level data by the EBC circuitry of FIG. 2, in accordance with an embodiment of the disclosure.

FIG. 4A is a flow diagram that illustrates exemplary operations for position dependent entropy coding of residual level data by the EBC circuitry of FIG. 2, in accordance with an embodiment of the disclosure. FIG. 4A is explained in conjunction with elements from FIGS. 1, 2, 3A, and 3B. With reference to FIG. 4A, there is shown a flow diagram 400A, which starts at 404. The flow diagram 400A describes a flow of application of position-dependent entropy coding of the first block 402 of quantized-transformed residual levels.

As shown, the first block 402 may be a "4×4" block, which includes a plurality of quantized-transformed residual levels, i.e. $A_{11}$, $A_{12}$, $A_{13}$, $A_{14}$, $A_{21}$, $A_{22}$, $A_{23}$, $A_{24}$, $A_{31}$, $A_{32}$, $A_{33}$, $A_{34}$, $A_{41}$, $A_{42}$, $A_{43}$, and $A_{44}$. Here, $A_{11}$ may be the DC quantized-transformed residual level and remaining $A_{12}$, $A_{13}$, $A_{14}$, $A_{21}$, $A_{22}$, $A_{23}$, $A_{24}$, $A_{31}$, $A_{32}$, $A_{33}$, $A_{34}$, $A_{41}$, $A_{42}$, $A_{43}$, and $A_{44}$ may be AC quantized-transformed residual levels. The encoder circuitry 206 may be configured to scan the first block 402 in a DC-to-AC scan order, where the DC quantized-transformed residual level are scanned first followed by a progressive row-wise scan of AC quantized-transformed residual levels.

At 404, it may be determined whether an absolute value of the quantized-transformed residual level "$A_{11}$" is less than or equal to "5". Here, "5" may be the threshold level value, as described in FIGS. 3A and 3B. The encoder circuitry 206 may be configured to determine whether the absolute value of the quantized-transformed residual level "$A_{11}$" is less than or equal to "5". In a case, where the absolute value of "A11" is less than or equal to "5", control passes to 406. Otherwise, control passes to 408.

At 406, "$A_{11}$" may be classified into a first set of quantized-transformed residual levels. The encoder circuitry 206 may be configured to classify "$A_{11}$" into the first set of quantized-transformed residual levels. The classification of "$A_{11}$" into the first set may indicate that the absolute value of "$A_{11}$" is less than or equal to the threshold level value of "5". Also, such classification may indicate that "$A_{11}$" may be entropy coded by the Huffman entropy coding scheme.

At 408, "$A_{11}$" may be classified into a second set of quantized-transformed residual levels. The encoder circuitry 206 may be configured to classify "$A_{11}$" into the second set of quantized-transformed residual levels. The classification of "$A_{11}$" into the second set may indicate that the absolute value of "$A_{11}$" is greater than the threshold level value of "5". Also, such classification may indicate that "$A_{11}$" may need a skip code to segregate itself from the first set and further entropy coded by the exp-Golomb entropy coding scheme.

At 410, it may be determined whether "$A_{11}$" is part of a luma block. The luma block corresponds to a luminance image block that is a transformation of a Red-Green-Blue (RGB) (or a BGR) image block. The encoder circuitry 206 may be configured to determine whether "$A_{11}$" is part of the luma block in order to select a suitable Huffman table to generate a Huffman code for "$A_{11}$". In a case where "A11" is part of the luma block, control passes to 412. Otherwise, control passes to 414.

At 412, a Huffman code for "$A_{11}$" may be generated based on a default Huffman table for the luma block. The encoder circuitry 206 may be configured to generate a Huffman code for "$A_{11}$", based on a default Huffman table for the luma block. In some embodiments, instead of the default Huffman table, the encoder circuitry 206 may be configured to select a Huffman table from a pre-specified set of Huffman tables (e.g., $T_0$, $T_1$, $T_2$, $T_3$, and $T_4$, as provided in Table 1 of FIG. 2). The selection of a specific Huffman table may depend upon a position of a selected quantized-transformed residual level, such as "$A_{11}$", in the luma block (i.e. the first block). Also, in some embodiments, the selection of a specific Huffman table may depend upon the DC-to-AC scan order that followed in the luma block.

At 414, a Huffman code for "$A_{11}$" may be generated based on a default Huffman table for the chroma block (e.g., Cb/Chroma-U or Cr/Chroma-V block). The encoder circuitry 206 may be configured to generate a Huffman code for "$A_{11}$", based on a default Huffman table for the chroma block. In some embodiments, instead of the default Huffman table, the encoder circuitry 206 may be configured to select a Huffman table from a pre-specified set of Huffman tables (e.g., $T_0$, $T_1$, $T_2$, $T_3$, and $T_4$, as provided in Table 1 of FIG. 2). The selection of a specific Huffman table may depend upon a position of a selected quantized-transformed residual level, such as "$A_{11}$", in the chroma block (i.e. the first block). Also, in some embodiments, the selection of a specific Huffman table may depend upon the DC-to-AC scan order that followed in the chroma block.

At 416, a skip code may be generated for "$A_{11}$" based on a default Huffman table from the pre-specified set of Huffman tables. The encoder circuitry 206 may be configured to generate the skip code for "$A_{11}$". The skip code may be generated in order to assist the encoder circuitry 206 to identify at least one of an applicable entropy coding scheme for "$A_{11}$", and a class of "$A_{11}$". Also, the skip code when detected in the bit-stream by the decoder circuitry 208 may trigger the decoder circuitry 208 to treat the subsequent bits to be from a quantized-transformed residual level that has an absolute value greater than the threshold level value of "5" and select the entropy decoding scheme, such as exp-Golomb entropy decoding scheme, for the subsequent bits that follow the skip code in the bit-stream.

At 418, an exp-Golomb code may be generated for "$A_{11}$". The encoder circuitry 206 may be configured to generate the exp-Golomb code for "$A_{11}$" after the skip code for "$A_{11}$" has been generated. In certain embodiments, the exp-Golomb code may be generated for an absolute difference between "$A_{11}$" and the threshold level value of "5". In such implementation, the exp-Golomb code may store only the difference and not the entire value of "A11", which may result into a reduction in the number of bits that are otherwise required to store the value of "$A_{11}$".

At 420, the control may move to next quantized-transformed residual level, such as "$A_{12}$". The encoder circuitry 206 may be configured to move the control to the next quantized-transformed residual level in the first block 402, such as "$A_{12}$".

Figure 4B:
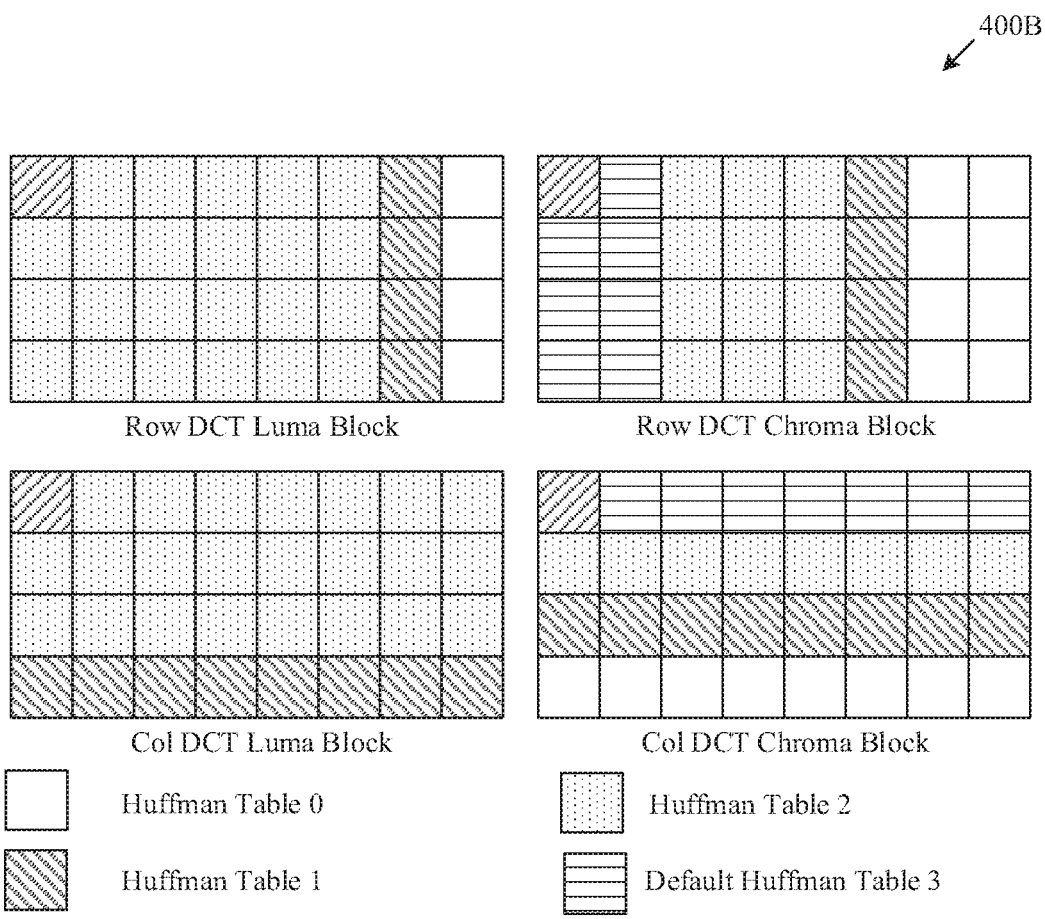
FIG. 4B is a diagram that illustrates different block outputs by application of a sequential encoding scheme on a two-dimensional (2D) image block by the EBC circuitry of FIG. 2, in accordance with an embodiment of the disclosure.

FIG. 4B is a diagram that illustrates different block outputs by application of a sequential encoding scheme on a 2D image block by the EBC circuitry of FIG. 2, in accordance with an embodiment of the disclosure. FIG. 4B is explained in conjunction with elements from FIGS. 1, 2, 3A, 3B, and 4A. With reference to FIG. 4B, there are shown different blocks of quantized-transformed residual levels, i.e. a row DCT Luma Block, a Column DCT Luma Block, a row DCT Chroma Block, and a Column DCT Chroma Block. In the row DCT Luma Block, the Column DCT Luma Block, the row DCT Chroma Block, and the Column DCT Chroma Block, different regions have been shown to specify a Huffman table from a set of pre-specified Huffman tables (e.g. $T_0$, $T_1$, $T_2$, $T_3$, and $T_4$, as shown in Table 1) to be used to encode corresponding blocks.

Figure 5A:
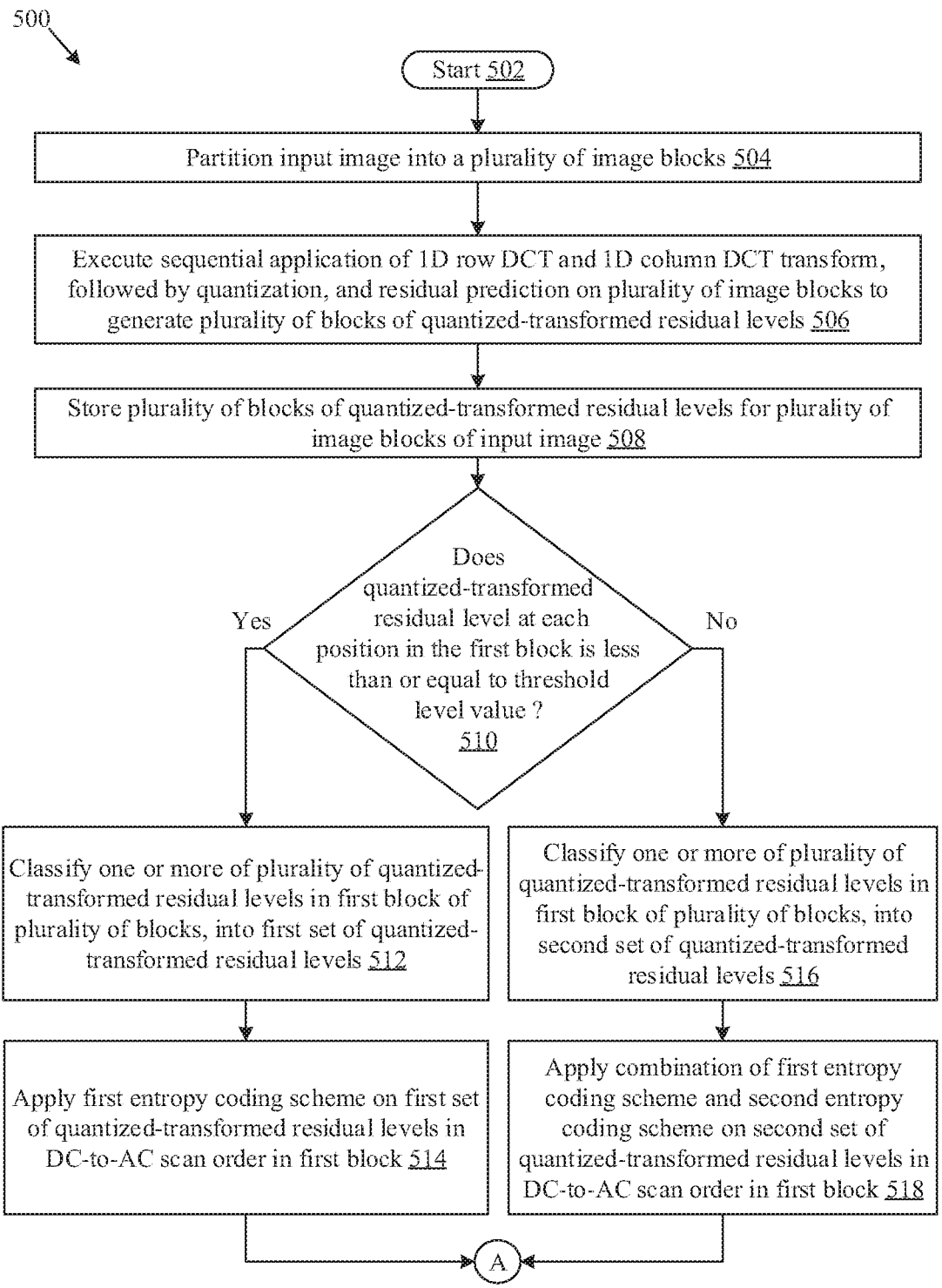
FIGS. 5A and 5B, collectively, depict a flow chart that illustrates an exemplary method for position dependent entropy coding of residual level data, in accordance with an embodiment of the disclosure.
Figure 5B:
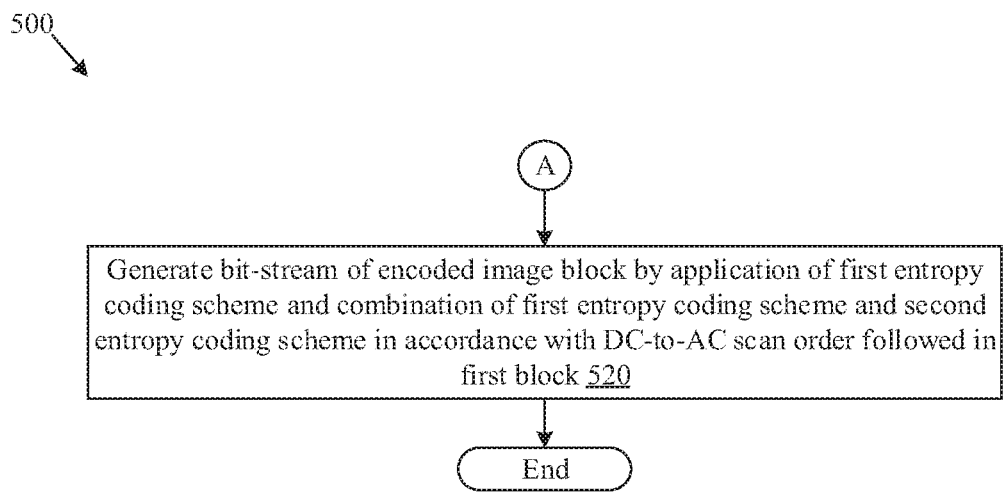

FIGS. 5A and 5B, collectively, depict a flow chart that illustrates an exemplary method for position dependent entropy coding of residual level data, in accordance with an embodiment of the disclosure. FIG. 5 is explained in conjunction with elements from FIGS. 1, 2, 3A, 3B, 4A, and 4B. With reference to FIGS. 5A and 5B, there is shown a flowchart 500. The flowchart 500 may describe operations that start at 502 and proceed to 504.

At 504, an input image may be partitioned into a plurality of image blocks. The encoder circuitry 206 may be configured to partition the input image, for example, a "1280×720" input image, into a plurality of image blocks, for example, a plurality of 16×16 image blocks.

At 506, a sequential application of a 1D row DCT transform and 1D column DCT transform, followed by quantization, and a residual prediction may be executed on the plurality of image blocks to generate a plurality of blocks of quantized-transformed residual levels. The encoder circuitry 206 may be configured to execute a sequential application of a 1D row DCT transform and 1D column DCT transform, followed by quantization, and a residual prediction on the plurality of image blocks to generate a plurality of blocks of quantized-transformed residual levels.

At 508, the plurality of blocks of quantized-transformed residual levels for the plurality of image blocks of the input image may be stored. The memory (such as the on-chip memory 204 or the external memory 110) may be configured to store the plurality of blocks of quantized-transformed residual levels for the plurality of image blocks of the input image.

At 510, it may be determined whether a quantized-transformed residual level at each position in the first block is less than or equal to the threshold level value. The encoder circuitry 206 may be configured to determine whether a quantized-transformed residual level at each position in the first block is less than or equal to the threshold level value. In a case where the quantized-transformed residual level at each position in the first block is less than or equal to the threshold level value, control passes to 508. Otherwise, control passes to 512.

At 512, one or more of the plurality of quantized-transformed residual levels in a first block of the plurality of blocks may be classified into a first set of quantized-transformed residual levels. The encoder circuitry 206 may be configured to classify one or more of the plurality of quantized-transformed residual levels in the first block into the first set of quantized-transformed residual levels.

At 514, a first entropy coding scheme may be applied on the first set of quantized-transformed residual levels in the DC-to-AC scan order in the first block. The encoder circuitry 206 may be configured to apply the first entropy coding scheme on the first set of quantized-transformed residual levels in the DC-to-AC scan order in the first block.

At 516, one or more of the plurality of quantized-transformed residual levels in a first block of the plurality of blocks may be classified into a second set of quantized-transformed residual levels. The encoder circuitry 206 may be configured to classify one or more of the plurality of quantized-transformed residual levels in the first block into the second set of quantized-transformed residual levels.

At 518, a combination of the first entropy coding scheme and a second entropy coding scheme may be applied on the second set of quantized-transformed residual levels in the DC-to-AC scan order in the first block. The encoder circuitry 206 may be configured to apply a combination of the first entropy coding scheme and a second entropy coding scheme on the second set of quantized-transformed residual levels in the DC-to-AC scan order in the first block.

At 520, a bit-stream of encoded image block may be generated by application of the first entropy coding scheme and the combination of the first entropy coding scheme and the second entropy coding scheme, in accordance with the DC-to-AC scan order followed in the first block. The encoder circuitry 206 may be configured to generate a bit-stream of encoded image block by application of the first entropy coding scheme and the combination of the first entropy coding scheme and the second entropy coding scheme, in accordance with the DC-to-AC scan order followed in the first block. Control passes to end.

Certain embodiments of the disclosure may be found in an embedded codec (EBC) circuitry (such as the EBC circuitry 108). Various embodiments of the disclosure may provide the EBC circuitry that may include a memory (such as the on-chip memory 204 or the external memory 110) and an encoder circuitry (such as the encoder circuitry 206) communicatively coupled to the memory. The memory may be configured to store a plurality of blocks of quantized-transformed residual levels for a plurality of image blocks of an input image. The encoder circuitry may be configured to classify a plurality of quantized-transformed residual levels in a first block of the plurality of blocks, into a first set of quantized-transformed residual levels and a second set of quantized-transformed residual levels. The classification may be done based on comparison of each quantized-transformed residual level of the plurality of quantized-transformed residual levels with a threshold level value. The encoder circuitry may be further configured to apply a first entropy coding scheme on the first set of quantized-transformed residual levels, and a combination of the first entropy coding scheme and a second entropy coding scheme on the second set of quantized-transformed residual levels in a DC-to-AC scan order in the first block. In some embodiments, the DC-to-AC scan order in the first block is a scanning sequence in which DC quantized-transformed residual levels may be scanned followed by AC quantized-transformed residual levels in the first block. A bit-stream of encoded image block may be generated further, by the encoder circuitry, by application of the first entropy coding scheme and the combination of the first entropy coding scheme and the second entropy coding scheme, in accordance with the DC-to-AC scan order followed in the first block.

In accordance with an embodiment, the encoder circuitry may be configured to execute a sequential encoding scheme on the plurality of image blocks, to generate a bit-stream of compressed image data of the input image. The bit-stream of compressed image data may include the generated bit-stream of encoded image block. The bit-stream of compressed image data may include header information that may indicate the sequential encoding scheme applied at an encoding stage of the plurality of image blocks to obtain the bit-stream of compressed image data. The sequential encoding scheme may include a sequential application of a forward transform, followed by quantization, a residual prediction, and the selected first entropy coding scheme or the combination of the first entropy coding scheme and the second entropy coding scheme. The encoder circuitry may be configured to generate the plurality of blocks of quantized-transformed residual levels based on the application of the sequential encoding scheme on the plurality of blocks of the input image. The forward transform may include a sequential application of a one-dimensional row direct cosine transform (1D row DCT) transformation and a 1D column DCT on the plurality of blocks of the input image.

In accordance with an embodiment, the comparison of each quantized-transformed residual level of the plurality of quantized-transformed residual levels with a threshold level value may correspond to a check whether an absolute value of each quantized-transformed residual level is less than or equal to the threshold level value. In some cases, an absolute value of each quantized-transformed residual level of the first set of quantized-transformed residual levels is less than or equal to the threshold level value. In other cases, an absolute value of each quantized-transformed residual level of the second set of quantized-transformed residual levels is greater than the threshold level value.

In certain embodiments, the first block may be a luma block when a corresponding image block is a luminance image block and the first block may be a chroma-U or a chroma-V block when a corresponding image block is a chroma image block.

In accordance with an embodiment, the first entropy coding scheme may be a Huffman entropy coding scheme and the second entropy coding scheme may be an exponential-Golomb entropy coding scheme. The encoder circuitry may be configured to encode the first set of quantized-transformed residual levels based on a set of pre-specified Huffman tables. The first set of quantized-transformed residual levels may be entropy coded in accordance with the Huffman entropy coding scheme. The set of pre-specified Huffman tables may include a first set of default Huffman tables and a second set of position-specific Huffman tables. In accordance with an embodiment, the encoder circuitry may be further configured to select a default Huffman table from the first set of default Huffman tables to encode the first set of quantized-transformed residual levels, in accordance with the DC-to-AC scan order in the first block. In accordance with another embodiment, the encoder circuitry may be further configured to select a position-specific Huffman table from the second set of position-specific Huffman tables, based on a specific position of each quantized-transformed residual level in the first block. The position-specific Huffman table may be selected to encode the first set of quantized-transformed residual levels, in accordance with the DC-to-AC scan order in the first block.

In accordance with an embodiment, the encoder circuitry may be further configured to generate a skip code for each quantized-transformed residual level of the second set of quantized-transformed residual levels, in accordance with the first entropy coding scheme. The skip code may be generated based on a set of pre-specified Huffman tables. The skip code may be generated to allow a decoder circuitry to classify each quantized-transformed residual level into the first set of quantized-transformed residual levels or the second set of quantized-transformed residual levels. Thus, the encoder circuitry may be further configured to encode the second set of quantized-transformed residual levels based on the application of the second entropy coding scheme on the second set of quantized-transformed residual levels. Each quantized-transformed residual level may be encoded after the generation of the skip code for each quantized-transformed residual level of the second set of quantized-transformed residual levels.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program, in the present context, means any expression, in any language, code or notation, of a set of instructions intended to cause a system having an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. An embedded codec (EBC) circuitry, comprising:
   a memory configured to store a plurality of blocks of quantized-transformed residual levels for a plurality of image blocks of an input image; and
   encoder circuitry configured to:
      classify a plurality of quantized-transformed residual levels in a specific block of the plurality of blocks of quantized-transformed residual levels, into a first set of quantized-transformed residual levels and a second set of quantized-transformed residual levels,
         wherein the classification is based on comparison of each quantized-transformed residual level of the plurality of quantized-transformed residual levels with a threshold level value;
      apply, in a direct current-to-alternating current (DC-to-AC) scan order in the specific block, a first entropy coding scheme on the first set of quantized-transformed residual levels, and a combination of the first entropy coding scheme and a second entropy coding scheme on the second set of quantized-transformed residual levels,
         wherein the application is based on a specific position of a quantized-transformed residual level of the plurality of quantized-transformed residual levels in the specific block; and
      generate a bit-stream of encoded image block based on the application of the first entropy coding scheme and the combination of the first entropy coding scheme and the second entropy coding scheme.

2. The EBC circuitry according to claim 1, wherein the encoder circuitry is further configured to:
   execute a sequential encoding scheme on the plurality of image blocks; and generate a bit-stream of compressed image data of the input image based on the execution of the sequential encoding scheme, and the bit-stream of compressed image data comprises the generated bit-stream of encoded image block.

3. The EBC circuitry according to claim 2, wherein the bit-stream of compressed image data further comprises header information that indicates the sequential encoding scheme executed at an encoding stage of the plurality of image blocks to obtain the bit-stream of compressed image data, and the sequential encoding scheme comprises a sequential application of a forward transform, followed by quantization, a residual prediction, and the first entropy coding scheme or the combination of the first entropy coding scheme and the second entropy coding scheme.

4. The EBC circuitry according to claim 3, wherein the encoder circuitry is further configured to generate the plurality of blocks of quantized-transformed residual levels based on the execution of the sequential encoding scheme on the plurality of image blocks of the input image.

5. The EBC circuitry according to claim 3, wherein the forward transform comprises a sequential application of a one-dimensional row direct cosine transform (1D row DCT) transformation and a 1D column DCT on the plurality of image blocks of the input image.

6. The EBC circuitry according to claim 1, wherein the comparison corresponds to a check whether an absolute value of each quantized-transformed residual level of the plurality of quantized-transformed residual levels is less than or equal to the threshold level value.

7. The EBC circuitry according to claim 1, wherein an absolute value of each quantized-transformed residual level of the first set of quantized-transformed residual levels is less than or equal to the threshold level value.

8. The EBC circuitry according to claim 1, wherein an absolute value of each quantized-transformed residual level of the second set of quantized-transformed residual levels is greater than the threshold level value.

9. The EBC circuitry according to claim 1, wherein the specific block is a luma block when a corresponding image block of the plurality of image blocks is a luminance image block.

10. The EBC circuitry according to claim 1, wherein the specific block is one of a chroma-U block or a chroma-V block when a corresponding image block of the plurality of image blocks is a chroma image block.

11. The EBC circuitry according to claim 1, wherein the first entropy coding scheme is Huffman entropy coding scheme and the second entropy coding scheme is exponential-Golomb entropy coding scheme.

12. The EBC circuitry according to claim 11, wherein the encoder circuitry is further configured to encode the first set of quantized-transformed residual levels based on a set of pre-specified Huffman tables, and the first set of quantized-transformed residual levels is entropy coded based on the Huffman entropy coding scheme.

13. The EBC circuitry according to claim 12, wherein the set of pre-specified Huffman tables comprises a first set of default Huffman tables and a second set of position-specific Huffman tables.

14. The EBC circuitry according to claim 13, wherein the encoder circuitry is further configured to:

select a default Huffman table from the first set of default Huffman tables; and encode the first set of quantized-transformed residual levels based on the DC-to-AC scan order in the specific block, and the encode of the first set of quantized-transformed residual levels is based on the selection of the default Huffman table.

15. The EBC circuitry according to claim 13, wherein the encoder circuitry is further configured to:

select a position-specific Huffman table from the second set of position-specific Huffman tables based on a specific position of each quantized-transformed residual level of the plurality of quantized-transformed residual levels in the specific block; and encode the first set of quantized-transformed residual levels based on the selection of the position-specific Huffman table and the DC-to-AC scan order in the specific.

16. The EBC circuitry according to claim 1, wherein the encoder circuitry is further configured to generate a skip code for each quantized-transformed residual level of the second set of quantized-transformed residual levels, and the skip code is generated based on the first entropy coding scheme and a set of pre-specified Huffman tables.

17. The EBC circuitry according to claim 16, wherein the skip code is generated to allow a decoder circuitry to classify each quantized-transformed residual level of the plurality of quantized-transformed residual levels into one of the first set of quantized-transformed residual levels or the second set of quantized-transformed residual levels.

18. The EBC circuitry according to claim 16, wherein the encoder circuitry is further configured to encode the second set of quantized-transformed residual levels based on the application of the second entropy coding scheme on the second set of quantized-transformed residual levels, and each quantized-transformed residual level of the second set of quantized-transformed residual levels is encoded after the generation of the skip code for each quantized-transformed residual level of the second set of quantized-transformed residual levels.

19. The EBC circuitry according to claim 1, wherein the DC-to-AC scan order in the specific block is a scanning sequence in which DC quantized-transformed residual levels are scanned followed by AC quantized-transformed residual levels in the specific.

20. A method, comprising:

in an embedded codec (EBC) circuitry that comprises a memory and encoder circuitry:

storing, by the memory, a plurality of blocks of quantized-transformed residual levels for a plurality of image blocks of an input image;

classifying, by the encoder circuitry, a plurality of quantized-transformed residual levels in a specific block of the plurality of blocks of quantized-transformed residual levels, into a first set of quantized-transformed residual levels and a second set of quantized-transformed residual levels, wherein the classification is based on comparison of each quantized transformed residual level of the plurality of quantized-transformed residual levels with a threshold level value;

applying, by the encoder circuitry, in a direct current-to-alternating current (DC-to-AC) scan order in the specific block, a first entropy coding scheme on the first set of quantized-transformed residual levels and a combination of the first entropy coding scheme and a second entropy coding scheme on the second set of quantized-transformed residual levels,
    wherein the application is based on a specific position of a quantized-transformed residual level of the plurality of quantized-transformed residual levels in the specific block; and
generating, by the encoder circuitry, a bit-stream of encoded image block based on the application of the first entropy coding scheme and the combination of the first entropy coding scheme and the second entropy coding scheme.

21. An embedded codec (EBC) circuitry, comprising:

a memory configured to store a plurality of blocks of quantized-transformed residual levels for a plurality of image blocks of an input image; and encoder circuitry configured to:
    classify a plurality of quantized-transformed residual levels in a specific block of the plurality of blocks of quantized-transformed residual levels, into a first set of quantized-transformed residual levels and a second set of quantized-transformed residual levels, wherein
        the classification is based on comparison of each quantized-transformed residual level of the plurality of quantized-transformed residual levels with a threshold level value, and
        an absolute value of each quantized-transformed residual level of the first set of quantized-transformed residual levels is less than or equal to the threshold level value;
    apply, in a direct current-to-alternating current (DC-to-AC) scan order in the specific block, a first entropy coding scheme on the first set of quantized-transformed residual levels, and a combination of the first entropy coding scheme and a second entropy coding scheme on the second set of quantized-transformed residual levels; and
    generate a bit-stream of encoded image block based on the application of the first entropy coding scheme and the combination of the first entropy coding scheme and the second entropy coding scheme.

22. An embedded codec (EBC) circuitry, comprising:

a memory configured to store a plurality of blocks of quantized-transformed residual levels for a plurality of image blocks of an input image; and encoder circuitry configured to:
    classify a plurality of quantized-transformed residual levels in a specific block of the plurality of blocks of quantized-transformed residual levels, into a first set of quantized-transformed residual levels and a second set of quantized-transformed residual levels,
        wherein the classification is based on comparison of each quantized-transformed residual level of the plurality of quantized-transformed residual levels with a threshold level value;
    apply, in a direct current-to-alternating current (DC-to-AC) scan order in the specific block, Huffman entropy coding scheme on the first set of quantized-transformed residual levels, and a combination of the Huffman entropy coding scheme and exponential-Golomb entropy coding scheme on the second set of quantized-transformed residual levels;
    encode the first set of quantized-transformed residual levels based on a set of pre-specified Huffman tables, wherein
        the first set of quantized-transformed residual levels is entropy coded based on the Huffman entropy coding scheme, and
        the set of pre-specified Huffman tables comprises a first set of default Huffman tables and a second set of position-specific Huffman tables; and
    generate a bit-stream of encoded image block based on the application of the Huffman entropy coding scheme, and the combination of the Huffman entropy coding scheme and the exponential-Golomb entropy coding scheme.

\* \* \* \* \*